United States Patent [19]
Nord

[11] Patent Number: 4,515,039
[45] Date of Patent: May 7, 1985

[54] ROBOT JOINT

[75] Inventor: Keith W. Nord, Stillwater, Minn.

[73] Assignee: Ex-Cell-O Corporation, Troy, Mich.

[21] Appl. No.: 524,273

[22] Filed: Aug. 18, 1983

[51] Int. Cl.$^3$ ............................................. F16H 37/06
[52] U.S. Cl. .................................... 74/665 C; 901/29
[58] Field of Search ......................... 74/665 C; 901/29

[56] References Cited
U.S. PATENT DOCUMENTS

| | | | |
|---|---|---|---|
| 3,119,281 | 1/1964 | Gerber et al. ................. | 74/665 GB |
| 3,922,930 | 12/1975 | Fletcher et al. .................. | 901/29 X |
| 4,090,413 | 5/1978 | Vickland ........................ | 74/665 GB |

FOREIGN PATENT DOCUMENTS

| | | | |
|---|---|---|---|
| 23188 | 6/1974 | Japan ..................................... | 901/29 |
| 34268 | 3/1978 | Japan ..................................... | 901/29 |
| 0815515 | 6/1959 | United Kingdom ................. | 901/29 |
| 0293432 | 1/1979 | U.S.S.R. ............................... | 901/29 |
| 0707793 | 1/1980 | U.S.S.R. ............................... | 901/26 |
| 0872256 | 10/1981 | U.S.S.R. ............................... | 901/29 |

OTHER PUBLICATIONS

"Robot Wrist Actuators", Robotics Age, 11/12, 1982, pp. 15-22.

Primary Examiner—George H. Krizmanich
Attorney, Agent, or Firm—John P. Moran

[57] ABSTRACT

A robot joint including a housing, dual inputs on opposite sides of the housing, an eccentric driven by each inputs and adapted to both planetate around an inner surface of the housing and to drive a first pair of bevel gears, a second pair of bevel gears, each of which meshes with both of the first pair of bevel gears, and a single cylindrical output member secured to one of the second pair of bevel gears. If the dual inputs and, hence, the first pair of bevel gears are driven in the same direction at the same speed, the cylindrical output member is caused to be raised or lowered, whereas if driven at the same speed in opposite directions, the output member is caused to rotate in a clockwise or counterclockwise direction. Variations in speed and direction will result in desired combinations of "pitch" and "roll" movements.

4 Claims, 3 Drawing Figures

ROBOT JOINT

TECHNICAL FIELD

This invention relates generally to industrial robots and, more particularly, to a wrist, elbow or shoulder joint therefor.

BACKGROUND ART

Heretofore and currently, various "robots" or placement and/or positioning devices having been used for the mass production of parts or assemblies of parts, or for lifting and placing of heavy or cumbersome objects, or painting or performing other operations on such items in different, yet completely satisfactory, manners. It is desirable to utilize a simplified, compact, and efficient robot joint as one or more of the wrist, elbow and shoulder areas of a material handling apparatus.

DISCLOSURE OF THE INVENTION

Accordingly, a general object of the invention is to provide an improved, "robot" joint for providing movement in two axes, such as pitch or roll motions, or any combination of the two motions, which may be used as a wrist, elbow, and/or shoulder of an industrial robot.

Another object of the invention is to provide an improved robot joint including dual input means, bevel gear output means, and intermediate means for controlling both the rotation and the pivoting of the bevel gear output means in response to selected speeds and directions of rotation of said dual input means.

A further object of the invention is to provide a robot joint including a housing, dual input means on opposite sides of the fixed housing, cylindrical output means, an eccentric secured for rotation with each of the input means within the housing, a first pair of bevel gears connected for rotation by the respective eccentrics, and a second pair of oppositely disposed bevel gears, each of which meshes with both of the two bevel gears, the cylindrical output means being secured to one of the second pair of bevel gears, the speed and direction of rotation of the cylindrical output means and the raising and lowering thereof being controlled by the relative speeds and directions of rotation of the respective input means.

These and other objects of the invention will become more apparent when reference is made to the following description and the accompanying drawings.

BEST MODE OF CARRYING OUT THE INVENTION

Figure 1:
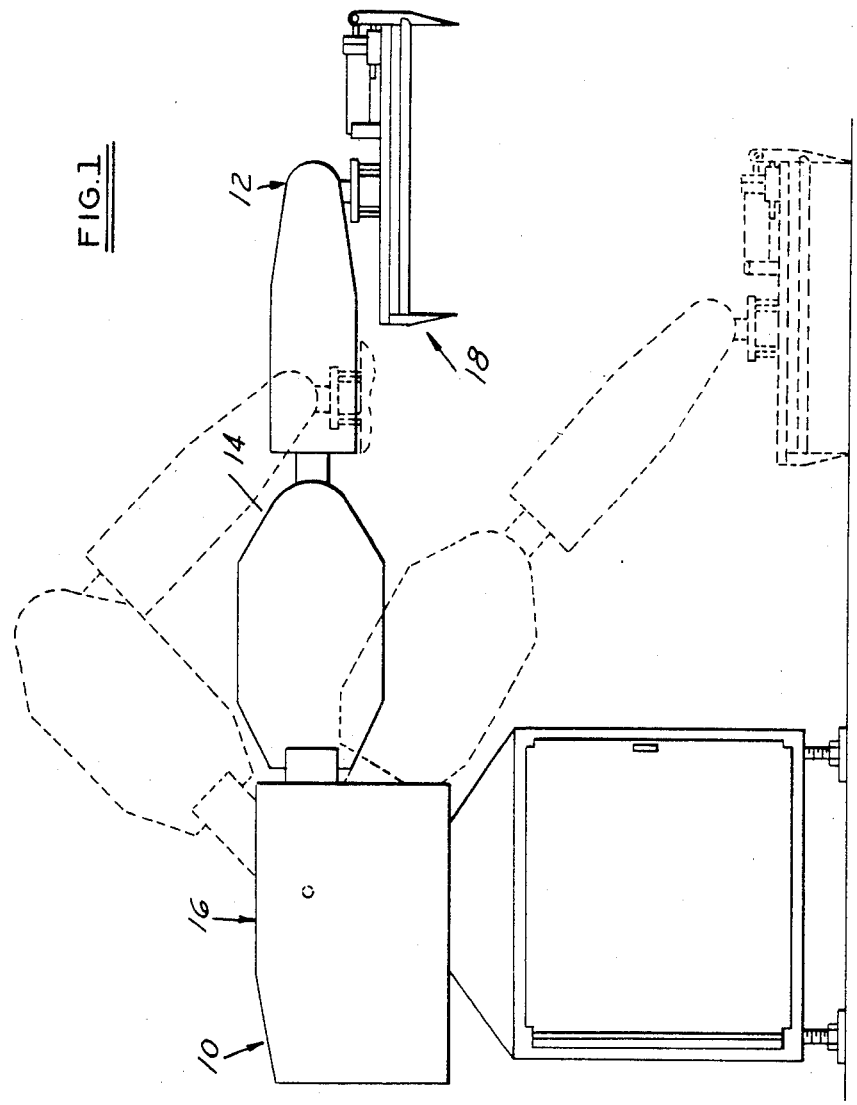
FIG. 1 illustrates generally a robot arrangement which may embody the invention.

Referring now to the drawings in greater detail, FIG. 1 illustrates a robot mechanism 10 which is adapted to picking up and placing an object, such as a stack of paperboard blanks, for example, into an operative location, such as in the magazine of a conventional forming, filling and sealing machine. The robot mechanism 10 includes a "wrist" 12, an "elbow" 14, and a "shoulder" represented as 16. A "hand" or pick-up mechanism 18 is operatively connected to the wrist 12. Except for size, the wrist, elbow and shoulder may be substantially identical. Such a unit is shown in more detail in FIG. 2, wherein a suitable input means is shown as pulley means 20. If desired, as an alternate arrangement, the input means may consist of two worms and two gears (not shown), in lieu of the pulley means 20. Each unit 12, 14, and 16 is capable of providing pitch or roll motions, or any combination of the two motions, as will be explained.

Referring once again to FIG. 2, the input pulley 20 is mounted on a stationary shaft 22 and is located adjacent a fixed housing 24. An eccentric 25 is rotatably mounted around the shaft 22 on a bearing 26 and a seal 27 and is secured by a screw 28 for rotation with the pulley 20. A pair of adjacent gears 29 and 30 are formed on the outer periphery of a common hub 31 which is mounted on the eccentric 26 by bearing 35. The teeth of the gear 29 are shown as meshing on the left side of FIG. 3 with the equivalent of teeth pockets formed by spaced pins 32 secured around the interior of the housing 24. Hence, the gear 29 will planetate around within the housing 24.

The teeth of the gear 30 mesh with pockets 33 formed in an annular member 34, causing the latter to be rotated on bearings 36 by the gear 30. The member 34 includes a hub 38 which is secured, as by welding, to a bevel input or drive gear 40 rotatably mounted via bearings 41 on the stationary shaft 22. The latter gear 40 meshes, in turn, with two oppositely disposed bevel output or driven gears 42 and 44, which are mounted via bearings 46 on respective rod-like members 47 and 48 extending in opposite directions from a block member 49 mounted loosely around the stationary shaft 22. A cylindrical extension 50 is formed on the bevel gear 44, extending outwardly through an opening 52 formed in a rotatable housing 54 within the housing 24 and supported via a bearing 56 on the outwardly extending end of the member 48 so as to be concentric therewith. The inner end 58 of the member 47 is supported in a pocket 59 formed in the housing 54. The block member 49 is connected at its ends to the housing 54. A pair of seals 60 are mounted between the fixed housing 24 and spaced grooves 62 formed in the housing 54.

Figure 2:
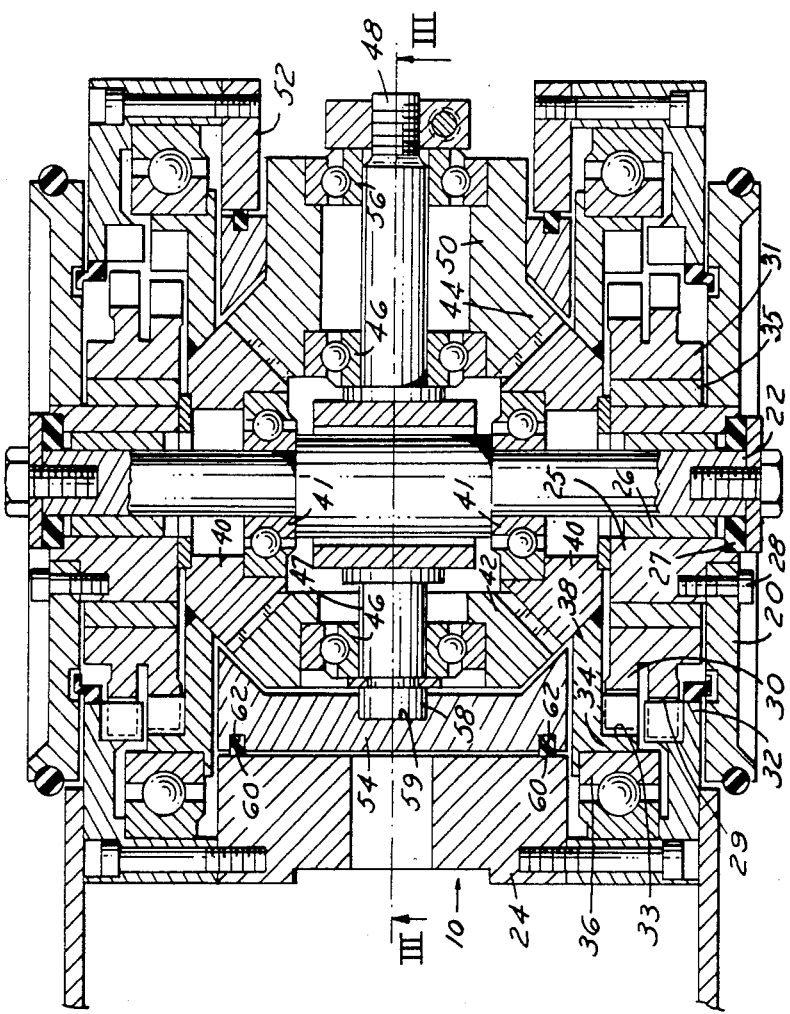
FIG. 2 is a cross-sectional view of the invention.

Inasmuch as there is an identical input from the other half of the drive unit illustrated in FIG. 2, depending upon the relative input speeds and directions from oppositely disposed input pulleys 20, the cylindrical extension 50 can be caused to roll, or rotate about its axis, in either direction, or to pitch, i.e., in effect, move in and out of the paper about the axis of the shaft 22.

Figure 3:
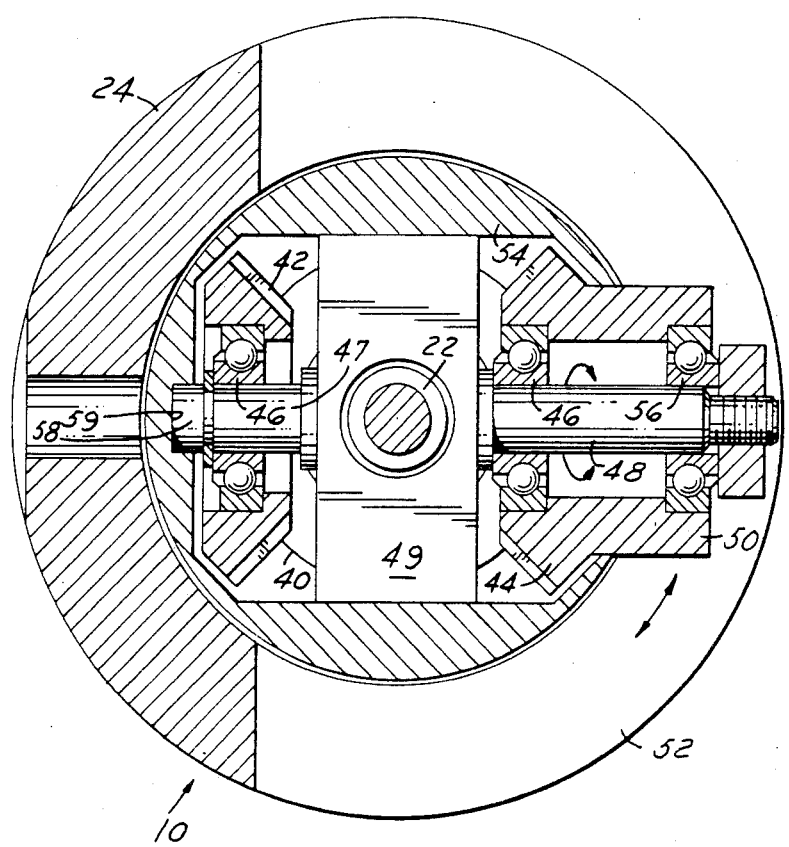
FIG. 3 is a cross-sectional view taken along he plane of the lines 3—3 of FIG. 2, and looking in the direction of the arrows.

More specifically, if, for example, the pulley means 20 and, hence, the two input drive gears 40 were rotated in the same direction at the same speed, the output gears 42 and 44 will be retained therebetween in a non-rotating mode, but, as may be realized from FIG. 3, will pivot about the shaft 22, causing the cylindrical extension 50 on the gear 44 to raise or lower, depending on the direction of rotation of the drive gears 40. If the drive gears 40 were rotated at the same speed in opposite directions, the output gears 42 and 44 and, hence, the cylindrical extension 50 will be rotated therebetween about the rod-like members 47 and 48, without any raising or lowering about the shaft 22. Variations in the speeds and directions of rotation of the input gears 40 will cause a combination of raising or lowering of the cylindrical extension 50 while it is rotating in either a clockwise or a counterclockwise direction, providing selected combined pitch and roll motions as required for various handling applications. Insofar as speeds are concerned if RR=rpm of output of right drive, and RL=rpm of output of left drive, then the rpm of raising=(RR+LL)/2, and rpm of rotating=(RR−LL)/2.

Now, if the assembly shown in FIG. 3 were considered to be located at the wrist 12 of the robot mechanism 10 (FIG. 1), it may be realized that, if the elbow 14 were undergoing a roll motion, there would result a "yaw" motion, or the angular motion in a horizontal plane about the normal axis of the entire wrist 12 unit. Hence, it is apparent that virtually any combinations of motions in three axes are possible when both elbow and wrist units 14 and 12 are used.

INDUSTRIAL APPLICABILITY

It should be apparent that the invention provides an efficient, sturdy and compact robot joint with two axes of movement, which, when combined with suitable gripper or "hand" means, may serve as a wrist, an elbow, or a shoulder of a robot mechanism used for picking up and placing various loads from one location to another.

While but one general embodiment of the invention has been shown and described, other modifications thereof are possible.

The embodiments of the invention in which an exclusive property or privilege is claimed are defined as follows:

1. A robot joint comprising a housing, dual input means on opposite sides of the housing, single output means, reduction means secured for rotation with each of said input means within said housing, a first pair of bevel gears operatively connected to said respective reduction means for rotation thereby, and a second pair of oppositely disposed bevel gears, each of which meshes with both of said two bevel gears, said single output means being secured to one of said second pair of bevel gears, the speed and direction of rotation of said single output means and the raising and lowering thereof being controlled by the relative speeds and directions of rotation of said respective input means.

2. The robot joint described in claim 1 wherein said reduction means is an eccentric gear in mesh with teeth means in said housing.

3. A robot joint comprising a stationary housing, a stationary shaft extending through said housing, an eccentric rotatably mounted on each end of said shaft and adapted to planetate around an inner surface of said housing, input means operatively connected to each eccentric exterior of opposite sides of said housing, a first pair of bevel gear means rotatably mounted between said shaft and said housing and adapted to be rotated by said eccentrics, a rotatable housing freely mounted in said stationary housing, a rod-like member pivotally mounted around said stationary shaft and having one end thereof connected to said rotatable housing, and a second pair of bevel gears mounted at spaced points along said rod-like member each of which meshes with both of said first pair of bevel gears, and an output extension secured to one of said second pair of bevel gears and extending through an opening formed in said rotatable housing, whereby any combination of selectively raising or lowering and clockwise or counterclockwise rotating of the output extension may be obtained, depending upon the relative speeds and directions of rotation of said respective input means.

4. A robot joint comprising a stationary housing, a stationary shaft extending through said housing, an eccentric rotatably mounted on each end of said shaft, input means operatively connected to each eccentric exterior of opposite sides of said housing, a pair of different diameter gears formed side-by-side on the outer periphery of each eccentric, teeth means formed on a wall of said housing for meshing with the larger of said pairs of different diameter gears, thereby causing said eccentrics to walk-around said housing wall, a pair of annular members rotatably mounted in said housing, teeth means formed on each annular member for meshing with the smaller of each pair of different diameter gears, a pair of input bevel gears rotatably mounted on said stationary shaft and secured for rotation with said respective annular members, an inner housing rotatably mounted in said stationary housing, a block member pivotally mounted around said stationary shaft, a pair of rod-like members extending in opposite directions from said block member, with one of said members extending through an opening formed in said inner housing and the other member supported at the inner end thereof in said inner housing, a pair of oppositely disposed output bevel gears mounted at spaced points along said rod-like members, each of which meshes with both of said pair of input bevel gears, a cylindrical extension member secured to one of said pair of output bevel gears and extending from said stationary and inner housings, whereby any combination of selectively rotating in either direction and raising or lowering of the cylindrical extension member may be obtained, depending upon the relative speeds and directions of rotation of said respective input means.

* * * * *